Patented June 11, 1929.

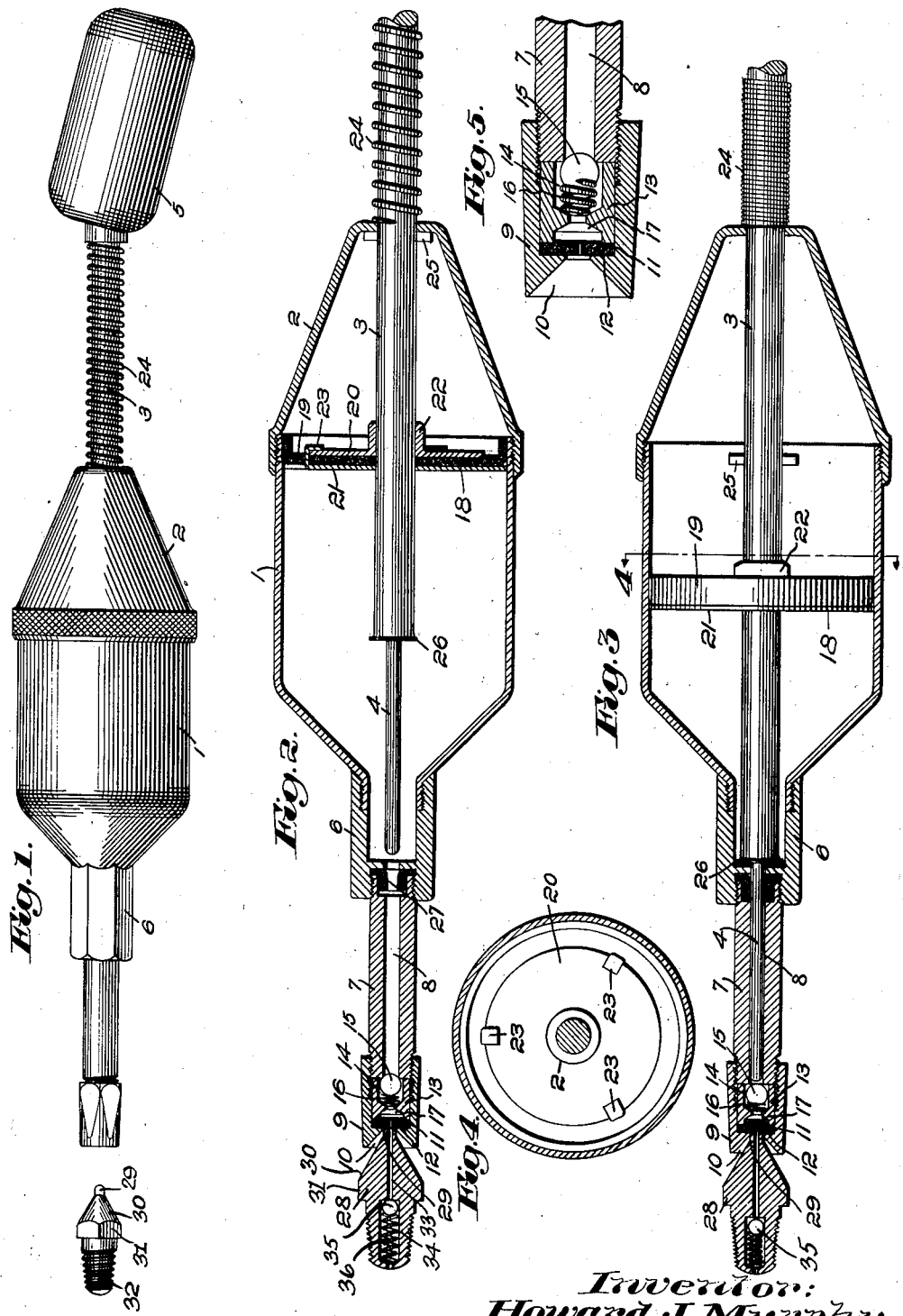

1,716,501

UNITED STATES PATENT OFFICE.

HOWARD J. MURPHY, OF READING, MASSACHUSETTS, ASSIGNOR, BY MESNE ASSIGNMENTS, TO ALEMITE MANUFACTURING CORPORATION, OF CHICAGO, ILLINOIS, A CORPORATION OF DELAWARE.

LUBRICATING APPARATUS.

Application filed July 22, 1925. Serial No. 45,300.

This invention aims to provide improvements in lubricating apparatus.

In the drawings, which illustrate a preferred embodiment of my invention:—

Figure 1 includes a side elevation of a lubricant-expelling device and a side elevation of a lubricant-receiving nipple;

Fig. 2 is a longitudinal section through the lubricant-expelling device and the nipple, being partly in elevation, partly broken away and showing the normal position of the parts;

Fig. 3 is a section similar to Fig. 2, but showing the piston and the plunger in operating positions;

Fig. 4 is a section on the line 4—4 of Fig. 3; and

Fig. 5 is an enlarged section of a portion of the discharge end of the device, being partly in elevation.

Referring to the drawings, I have shown a lubricant-expelling gun which includes means for expelling lubricant under high pressure to a lubricant-receiving nipple without the use of interengaging coupling means usually formed on the nipple and in the discharge end of the gun.

The device is simple to operate and may expel light grease as well as oil. Its supply barrel may be refilled by simply removing the rear head thereof and the means for expelling the lubricant which is assembled therewith as a unit.

The drawings illustrate a lubricant-expelling gun including a supply barrel 1, having a tapered rear head 2, which supports and guides a plunger stem 3 carrying a plunger 4 at one end and a handle 5 at the other end. At the discharge end of the barrel, I have provided a reduced portion 6 supporting an intermediate part 7 presenting a chamber 8 of relatively smaller cross-sectional area than said barrel.

The intermediate part carries a nozzle part 9 and presents a nipple-receiving orifice 10 surrounded by a tapered wall to permit angular engagement of the gun with the nipple.

Within the nozzle, I have provided a flexible packing or sealing washer 11 back-supported by a shoulder 12, and a valve carrying part 13 interposed between the washer and the end of the intermediate part 7. This valve carrying part 13 has a chamber 14 at its rear end in which is located a ball check 15 normally seated against the end of the intermediate part 7. The ball check is held against its seat by a spring 16 thereby to prevent passage of lubricant from the chamber 8 until the lubricant has been placed under pressure. At the outer end of the valve-carrying part, I have provided a second chamber 17, which permits some of the lubricant to press against the sealing washer 11 as more fully hereinafter described.

Within the barrel 1, I have provided a piston comprising a cup leather 19 bearing against the inner wall of the barrel and supported at both sides by metal disks 20 and 21 respectively. The disk 20 has a hub 22 which surrounds the stem 3 to guide the piston. The disk 21 is located at the opposite side of the cup leather 19 and has a plurality of prongs 23 (Figs. 2 and 4) pressed therefrom, which pass through the washer and are bent over the disk 20 to hold all three parts in assembled relation. This piston 18 is operated by atmospheric pressure to force lubricant from the barrel 1 to the chamber 8.

The plunger stem 3 carries a spring 24, interposed between the handle 5 and the end of the back head 2 (Fig. 1), for returning the plunger to its normal position. A stop pin 25 is also carried by the plunger stem and this pin abuts against the rear end of the rear head 2 (Fig. 2) to limit the rearward movement of the piston. The forward movement of the piston is limited by the compressed spring 24, as best illustrated in Fig. 3.

Assuming the lubricant-expelling parts of the gun to be disassembled, they may be assembled as a unit as follows. First the piston 20 is slipped over the end of the piston stem 3. It is prevented from sliding off the stem by a thin shoulder 26 at the inner end of the stem. The stop pin 25 is next driven into a hole through the stem 3 and the rear head 2 slid over the stem. Then the spring 24 is placed over the stem 3 and lastly the handle is secured to the end of the stem, thereby holding all the above-mentioned parts in assembled relation with the rear head 2 of the barrel 1. Thus when the head 2 is removed from the barrel 1, the piston, plunger, etc., are removed with it.

At the rear end of the chamber 8, I have provided a hat-shaped sealing washer 27 intersecting the chamber for circumferential engagement with the plunger 4. An annular space surrounds the plunger-engaging portion of the washer 27 so that the lubricant may press against the washer and provide a lubricant-pressed seal to prevent leakage of lubricant from the chamber 8 to the barrel 1 during expulsion of lubricant from the chamber 8.

The lubricant-receiving nipple 28 illustrated in the drawings comprises a rounded head portion 29 of small diameter, a tapered portion 30, a polygonal wrench engaging portion 31, and a screw threaded portion 32 for securing the nipple in the customary oil hole of a bearing. The nipple has an axial bore 33 of small diameter which leads into a larger bore 34, the latter serving to hold a ball check valve 35 which is normally held in engagement with and closing the lower end of the bore 33 by a spring 36.

Engagement of the gun with the nipple may be effected by introducing the nozzle over the nipple so that the relatively small rounded end portion 29 of the nipple is guided into contact with the packing 11, as illustrated in Fig. 2. If, then, pressure be exerted upon the handle 5 to push the plunger stem 4 toward the nipple 28, the plunger 3 will be forced into the chamber 8. The plunger first passes the sealing washer 27, and thereafter the lubricant is forced past the check valve 15 under relatively high potential pressure without leaking back into the barrel 1. As the lubricant passes into the chamber 17 back of the sealing washer 11, is presses against a relatively large portion of the surface of the washer to form a lubricant-pressed seal between the washer and the end of the nipple, as best illustrated in Fig. 3.

During expulsion of the lubricant from the chamber 8, the pin 25 moves toward the piston 18, but is stopped by complete compression of the spring 24 before it strikes the piston 18. This is true even when the barrel 1 is full of lubricant. Thus the entire controlling means of the plunger is located back of the piston 18 and is operable independent thereof and without interfering with the operation of the piston in any manner.

The orifice through the sealing packing 11 is very small so that the end of the nipple cannot pass through the packing.

The various angles at which the gun may be operated relative to the nipple, the sealing part surrounding the plunger and the relative area of the plunger relative to the contact area of the end of the nipple with the packing, are all substantially as shown and more fully described in the above-mentioned co-pending application.

During retraction of the plunger, the check ball 15 closes the chamber 8 and prevents air from leaking into the chamber. When the plunger 4 is moved toward the rear of the chamber 8, a vacuum is created in the chamber, thereby causing the atmospheric pressure to move the piston 18 forward in the barrel to force lubricant to the chamber 8. Where a light lubricant is used, some of this may flow past the hat-shaped sealing washer 27, so that the chamber may be filled gradually as the plunger is withdrawn. With other and heavier lubricant, the filling takes place when the plunger 4 is entirely out of the sealing washer 27. Thus if the plunger is reciprocated in short quick strokes when the nozzle is engaged with the nipple, lubricant will be forced from the chamber 8 every time that the plunger is moved forward, the chamber 8 being refilled automatically each time that the plunger 4 is retracted in the chamber 8.

While I have shown and described a preferred embodiment of my invention, it will be understood that changes involving omission, alteration, substitution and reversal of parts and even changes in the mode of operation, may be made without departing from the scope of my invention, which is best defined in the following claims.

Claims:

1. A lubricant-expelling device including a supply barrel, a chamber aligned with said barrel having a cross-sectional area substantially smaller than said barrel, a piston in said barrel for forcing lubricant into said chamber, a push-operated plunger for forcing lubricant from said chamber, a valve normally closing the outer end of said chamber and an annular lubricant pressed packing intersecting said chamber to prevent passage of lubricant from said chamber to said barrel during expulsion of lubricant from said chamber, but permitting such passage during the intervals between expulsion strokes.

2. A lubricant-expelling device including a supply barrel, a chamber aligned with said barrel having a cross-sectional area substantially smaller than said barrel, a piston in said barrel for forcing lubricant into said chamber, said piston operated by atmospheric pressure in said barrel, a valve normally closing the outer end of said chamber, a nozzle beyond said chamber for engagement by direct pressure only with a lubricant-receiving nipple, a push-operated plunger adapted to be forced into said chamber when said nozzle is engaged with a nipple thereby to expel lubricant from said chamber, and a hat-shaped combined sealing washer and valve intersecting said chamber for circumferentially engaging the plunger to prevent flow of lubricant from the chamber to the barrel during the forward movement of said plunger.

3. A high pressure lubricant-expelling device including a supply barrel, a high pressure chamber generally aligned therewith, a nozzle beyond said chamber, an atmospheric pressure operated piston in said barrel for forcing lubricant from said barrel to said chamber, a push-operated plunger for forcing lubricant from said chamber, a spring for returning the plunger to its normal position, and means for limiting the movement of said plunger in both directions, said limiting means and said spring, located and operated at all times back of said piston.

4. A push-operated lubricant-expelling device comprising, in combination, a nozzle for coaction with a lubricant-receiving nipple when pressed thereagainst, a lubricant supply chamber, a piston in said lubricant supply chamber, a high pressure plunger having a rod passing through said piston, a high pressure chamber, a hat washer operatively interposed between said lubricant supply chamber and said high pressure chamber and having its sealing flange extending away from the supply chamber, said high pressure plunger retractible entirely out of said high pressure chamber to a point permitting free passage of lubricant through said hat washer and into said high pressure chamber.

5. A push-operated lubricant-expelling device comprising, in combination, a nozzle for coaction with a lubricant-receiving nipple when pressed thereagainst, a lubricant supply chamber, a piston in said lubricant supply chamber, a high pressure plunger having a rod passing through said piston, a high pressure chamber, a hat washer operatively interposed between said lubricant supply chamber and said high pressure chamber and having its sealing flange extending away from the supply chamber, said high pressure plunger retractible entirely out of said high pressure chamber to a point permitting free passage of lubricant through said hat washer and into said high pressure chamber, said high pressure plunger reduced at its end to facilitate entrance of said plunger into said hat washer.

6. A push-operated lubricant-expelling device comprising, in combination, a nozzle for coaction with a lubricant-receiving nipple when pressed thereagainst, a lubricant supply chamber, a piston in said lubricant supply chamber, a high pressure plunger having a rod passing through said piston, a high pressure chamber, a hat washer operatively interposed between said lubricant supply chamber and said high pressure chamber and having its sealing flange extending away from the supply chamber, said high pressure plunger retractible entirely out of said high pressure chamber to a point permitting free passage of lubricant through said hat washer and into said high pressure chamber, said high pressure plunger guided by said piston in said supply chamber and by a bearing located a substantial distance rearwardly of the rear end of said supply chamber.

7. A push-operated lubricant-expelling device comprising, in combination, a nozzle for coaction with a lubricant-receiving nipple when pressed thereagainst, a lubricant supply chamber, a piston in said lubricant supply chamber, a high pressure plunger having a rod passing through said piston, a high pressure chamber, a hat washer operatively interposed between said lubricant supply chamber and said high pressure chamber and having its sealing flange extending away from the supply chamber, said high pressure plunger retractible entirely out of said high pressure chamber to a point permitting free passage of lubricant through said hat washer and into said high pressure chamber, said high pressure plunger reduced at its end to facilitate entrance of said plunger into said hat washer and guided by said piston in said supply chamber and by a bearing located a substantial distance rearwardly of the rear end of said supply chamber.

8. A high pressure lubricant compressor of the class described comprising, in combination, a barrel for holding a quantity of lubricant, a high pressure cylinder aligned with said barrel and supplied therefrom, a nozzle rigidly connected to said cylinder and adapted to receive the lubricant discharged therefrom, said nozzle adapted to form a contact seal with a lubricant-receiving nipple when pressed thereagainst in the act of operating said compressor, an outwardly opening check valve interposed between said cylinder and said nozzle, a follower in said barrel, a solid plunger telescopable with said cylinder, and a lubricant-pressed sealing washer for effecting a seal between said plunger and said high pressure cylinder, said plunger and sealing washer co-operating with each other to form valve means for controlling admission of lubricant to said high pressure cylinder.

9. A high pressure lubricant compressor of the class described comprising, in combination, a barrel for holding a quantity of lubricant, a high pressure cylinder receiving its supply of lubricant from said barrel, a pressure contact sealing nozzle rigidly connected to said high pressure cylinder, a follower in said barrel, and valve means for controlling admission of lubricant to said high pressure cylinder, said valve means comprising a plunger for telescoping with said cylinder and a lubricant-pressed sealing washer for effecting a seal between said plunger and said cylinder.

10. A lubricant-expelling device including a discharge nozzle containing a lubricant-pressed packing for making a tight seal between the nozzle and a lubricant-receiving nipple, and a tapered orifice at one side of said packing to permit lubricant to be expelled from said device to the nipple while the device is held against said nipple in line with the axis thereof or at a substantial angle relative thereto without affecting the seal between the packing and the end of the nipple.

11. A lubricant-expelling device including push-operated means for expelling lubricant from the device, a nozzle rigidly connected to the discharge end of the device and engageable with a lubricant-receiving nipple without the aid of interengaging coupling means, a lubricant-pressed sealing part presented by said nozzle for providing a seal between the device and the nipple and a tapered orifice leading to said sealing part for cooperation with the tapered portion of the nipple, thereby to permit lubricant to be forced to the nipple while the device is held against the nipple at a substantial angle relative thereto.

12. A lubricant-expelling device including push-operated means for expelling lubricant from the device, a nozzle rigidly connected to the discharge end of the device and engageable with a lubricant-receiving nipple without the aid of interengaging coupling means, a lubricant-pressed sealing part presented by said nozzle for providing a seal between the device and the nipple, a tapered orifice leading to said sealing part for cooperation with the tapered portion of the nipple, thereby to permit lubricant to be forced to the nipple while the device is held against the nipple at a substantial angle relative thereto, and a second lubricant-pressed sealing and valve part engageable with the push-operated means to prevent leakage past said means when the lubricant is being forced to the nipple, but permitting such leakage when said push-operated means are retracted.

In testimony whereof, I have signed my name to this specification.

HOWARD J. MURPHY.